United States Patent
Seydaliev et al.

(10) Patent No.: US 9,766,352 B2
(45) Date of Patent: Sep. 19, 2017

(54) RADIATION DETECTION APPARATUS

(71) Applicant: Atomic Energy of Canada Limited / Energie Atomique du Canada Limitee, Chalk River (CA)

(72) Inventors: Marat Seydaliev, Deep River (CA); Jacques Dubeau, Gatineau (CA)

(73) Assignee: Atomic Energy of Canada Limited / Énergie Atomique du Canada Limitée, Chalk River (CA)

(*) Notice: Subject to any disclaimer, the term of this patent is extended or adjusted under 35 U.S.C. 154(b) by 0 days.

(21) Appl. No.: 14/780,193

(22) PCT Filed: Mar. 28, 2014

(86) PCT No.: PCT/CA2014/050319
§ 371 (c)(1),
(2) Date: Sep. 25, 2015

(87) PCT Pub. No.: WO2014/153668
PCT Pub. Date: Oct. 2, 2014

(65) Prior Publication Data
US 2016/0047919 A1 Feb. 18, 2016

Related U.S. Application Data

(60) Provisional application No. 61/806,074, filed on Mar. 28, 2013.

(51) Int. Cl.
G01T 1/185 (2006.01)
H01J 47/06 (2006.01)

(52) U.S. Cl.
CPC .............. G01T 1/185 (2013.01); H01J 47/06 (2013.01)

(58) Field of Classification Search
CPC ...................................................... G01T 1/185
See application file for complete search history.

(56) References Cited

U.S. PATENT DOCUMENTS 4,670,656 A 6/1987 Bolon
2008/0029709 A1 2/2008 Yeo
2011/0133055 A1 6/2011 Andrews et al.

FOREIGN PATENT DOCUMENTS

WO 2010091695 A2 8/2010
WO 2014153668 A1 10/2014

OTHER PUBLICATIONS

International Search Report issued Jun. 9, 2014 in respect of International Application No. PCT/CA2014/050319.
International Preliminary Report on Patentability issued Sep. 29, 2015 in respect of International Application No. PCT/CA2014/050319.

(Continued)

Primary Examiner — Casey Bryant
(74) Attorney, Agent, or Firm — Bereskin & Parr/S.E.N.C.R.L., s.r.l.

(57) ABSTRACT

A method of measuring ionizing radiation may include the steps of: a) creating charged particles; b) causing the charged particles to generate the electrons; c) collecting at least a portion of the multiplied free electrons using at least two anode pads provided within the chamber, each anode pad producing a corresponding anode output signal, to provide higher sensitivity; and d) recording each anode output signal.

20 Claims, 10 Drawing Sheets

(56) References Cited

OTHER PUBLICATIONS

Farahmand et al., "Design of a New Tissue-Equivalent Proportional Counter Based on a Gas Electron Multiplier", Nuclear Instruments And Methods In Physics Research, vol. 509, pp. 262-267, 2003.
Boutruche et al. "A New Concept of a High Sensitivity Tissue-Equivalent Proportional Counter for Individual Neutron Dosimetry", Radiation Protection Dosimetry, vol. 52, Nos. 1-4, pp. 335-338, 1994.
Dubeau et al. "Neutron Microdosimetric Response of a Gas Electron Multiplier", Radiation Protection Dosimetry, vol. 128, No. 4, pp. 413-420, 2008.
Sasaki et al. "Development of a New Space Dosimeter Based on LET Measurements of Heavy Charged Particles", presented at the IEEE Nuclear Science and Medical Imaging Symposium, Anaheim, 2012.
Dubeau et al. "Dosimetric Responses to Gamma-Rays and Neutron of a Tissue Equivalent Microstrip Gas Counter", Radiation Protection Dosimetry, vol. 91, No. 4, pp. 391-401, 2000.
Kaminski et al. "Study of Various Anode Pad Readout Geometries in a GEM-TPC", IEEE Transactions on Nuclear Science. vol. 52, No. 6, p. 2900-2906, Dec. 31, 2015.
Bordy et al. "Improving a Multicellular Tissue-Equivalent Proportional Counter for Personal Neutron Dosimetry", Radiation Protection Dosimetry, vol. 61, Nos. 1-3, pp. 175-178, 1995.
Wang et al, Development and Test of a Gem-Based TEPC for Neutron Protection Dosimetry, Health Physics, vol. 94, No. 5, pp. 440-448, 2008.
Extended European Search Report issued Oct. 27, 2016 in respect of European Application No. 14774451.0.

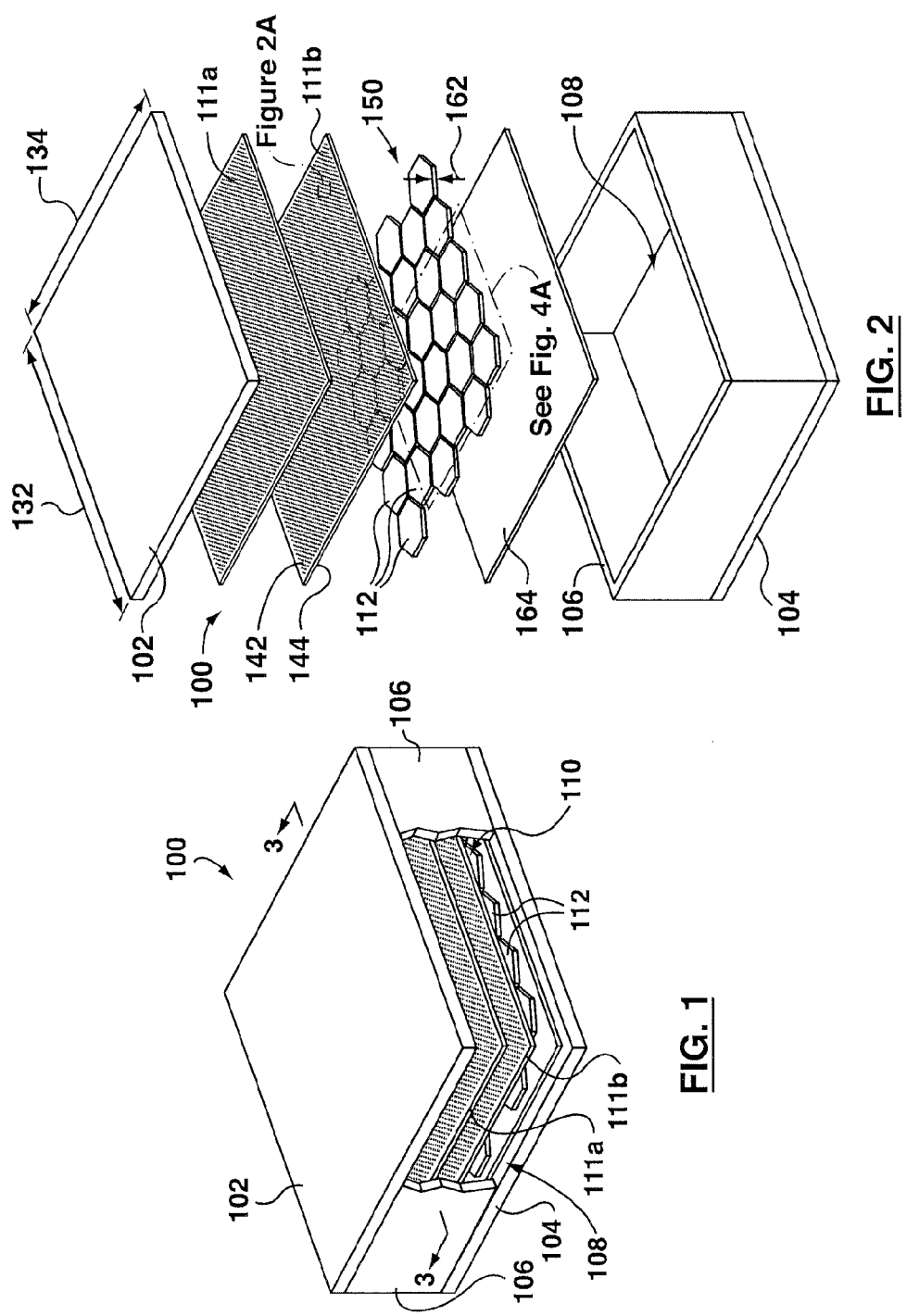

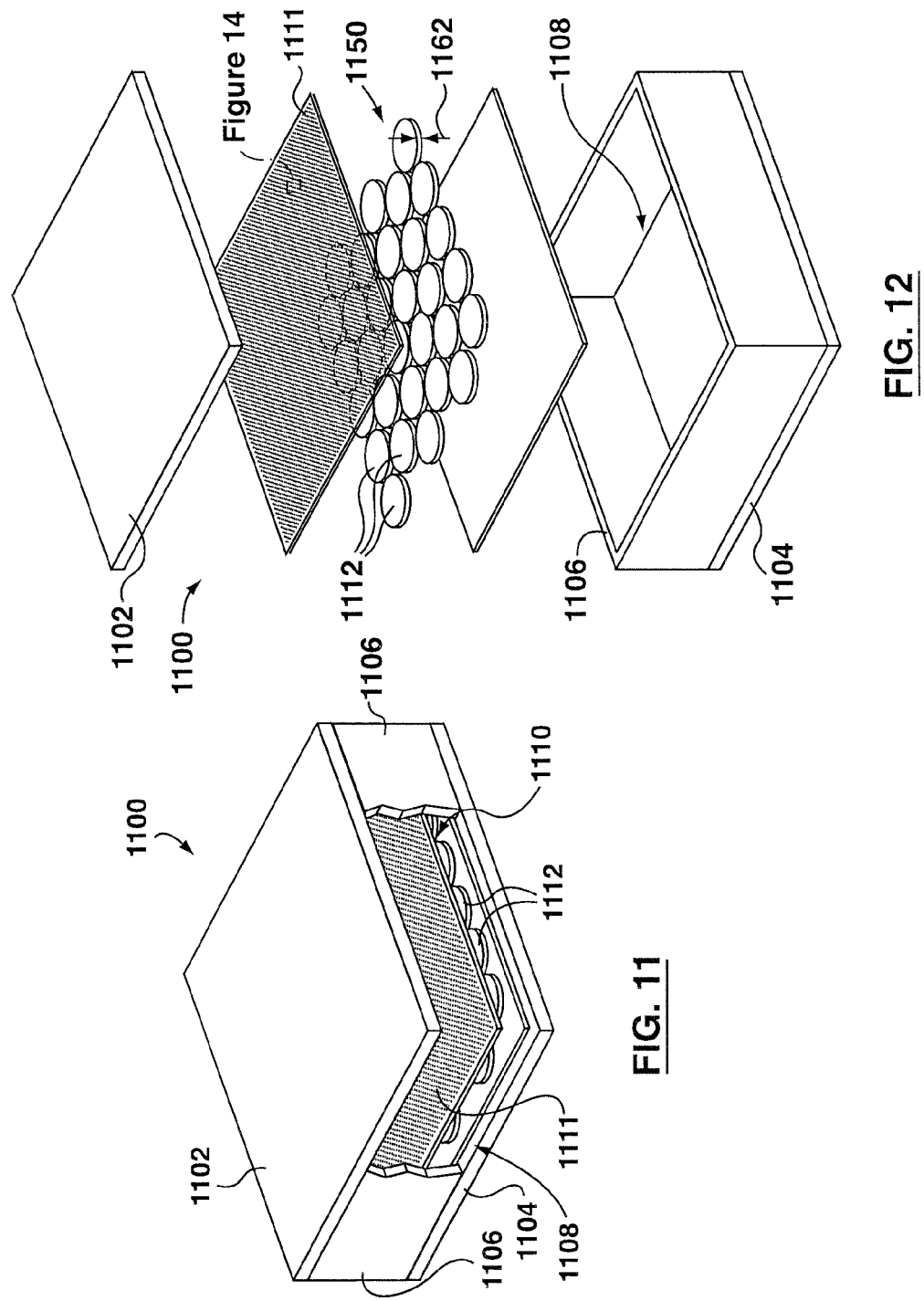

RADIATION DETECTION APPARATUS

CROSS-REFERENCE TO RELATED APPLICATIONS

This application is a National Stage (371) of International Application No. PCT/CA2014/050319 filed Mar. 28, 2014, which claims the benefit of co-pending U.S. Provisional Patent Appn. No. 61/806,074, filed Mar. 28, 2013, the entirety of which is incorporated herein by reference.

FIELD

The present subject matter of the teachings described herein relates generally to radiation detection apparatuses, and specifically to tissue equivalent proportional counters.

BACKGROUND

M. Farahmand, A. J. J. Bos, J. Huizenga, L. De Nardo and C. W. E. Van Eijk, *Design of a new tissue-equivalent proportional counter based on a gas electron multiplier*, Nuclear Instruments and Methods in Physics Research, 509 (1-3), pp. 262-267, (2003) discloses that by employing a Gas Electron Multiplier a new type of mini multi-element Tissue-Equivalent Proportional Counter (TEPC) has been designed and constructed. This paper describes the design of this novel counter. The first pulse height measurements with this counter for both methane- and propane-based Tissue Equivalent gases are presented. These results show promising properties for application of this novel type TEPC in microdosimetric measurements.

B. Boutruchet, J. M. Bordy, J. Barthe, P. Segurt, G. Portal "A New Concept of a High Sensitivity Tissue Equivalent Proportional Counter for Individual Neutron Dosimetry", Rad. Prot. Dosimetry vol. 52, Nos 1-4, pp 335-338, 1994 discloses a concept of TEPC for personal radiation protection monitoring. A high sensitivity to neutron and gamma radiation is obtained by the use of a multichannel cathode. Electrons and ions drift in an electric field created in each channel by a bias current inside the cathode material. Three stages are described, a single-channel counter with a needle anode, a one and five channel counter with a wire anode and a multicellular counter with nine wire anodes and more than 250 channels. The first results on the electric filed distribution and electron behavior are presented. A quasi Dirac chord length distribution is determined. An example of the microdosimetric spectrum obtained with a monoenergetic neutron irradiation is shown.

J. Dubeau and A. J. Waker, "*Neutron microdosimetric response of a gas electron multiplier*", Radiation Protection Dosimetry, 128 (4), pp. 413-420, 2008 discloses a new high-sensitivity tissue equivalent proportional counter (TEPC) on the basis of the gas electron multiplier (GEM) detector used in high-energy physics experiments has been designed, constructed and tested in a variety of neutron fields. The GEM-TEPC makes use of a lithographically produced strip readout system to achieve the equivalent of a large number of miniature TEPC detector elements. This new device could be used as the basis of an electronic personal dosimeter for gamma and neutron mixed radiation fields.

S. Sasaki, K. Saito, K. Takahashi, H. Tawara, T. Doke, K. Miuchi, T. Komiyama, H. Kitamura, Y. Uchihori, K. Terasawa, *Development of a New Space Dosimeter Based on LET measurements of Heavy Charged Particles*, presented at the IEEE Nuclear Science and Medical Imaging Symposium, Anaheim 2012, discusses an instrument able to do the complete 3D reconstruction of a charged particle track for the exact determination of the linear energy transfer rather than the lineal energy, as is measured by TEPCs. The instrument has a 2D readout pattern. The anodes are small spots where signal amplification happens through gas avalanching.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

In accordance with one broad aspect of the teachings disclosed herein, a tissue-equivalent proportional counter apparatus may include a first endwall, a second endwall spaced apart from the first endwall and sidewalls extending therebetween to provide an enclosed chamber interior containing a tissue-equivalent counting gas. The first endwall may be a cathode and may be formed from a tissue-equivalent material that is operable to produce secondary charged particles within the chamber when exposed to ionizing radiation. A micromesh avalanching structure may be provided within the chamber and positioned between the first endwall and the second endwall. A plurality of anode pads may be provided within the chamber interior and may be spaced apart from the micromesh avalanching structure and positioned between the micromesh avalanching structure and the second endwall. Each anode pad may be configured to collect at least a portion of the secondary charged particles passing through the micromesh avalanching structure and generate a corresponding anode output signal. A power source may be used to apply a voltage between the cathode and the plurality of anodes.

The micromesh avalanching structure may include one or more gas electron multipliers (GEM), and may include two GEMs.

The micromesh avalanching structure may include at least one of a gas electron multiplier (GEM), a thick GEM and a micromegas.

The first endwall may be formed from plastic.

The first endwall may be formed from A-150 conducting plastic.

Each anode may include a generally planar pad mounted to an inner surface of the second endwall.

Each anode may be a hexagonal pad.

The pads may be formed from copper.

Each pad may be laterally spaced apart from each adjacent pad by an offset distance that may be between about 0.05 mm and about 0.3 mm.

Each pad may have a respective pad width that is between about 0.1 mm and about 10 mm.

The apparatus may include a data acquisition apparatus that may have a plurality of inputs, each input connected to at least one of the plurality of anodes to receive the corresponding anode output signal.

The data acquisition apparatus may be configured to generate an aggregate output signal based on a combination of the plurality of anode output signals.

The GEM may be offset from the first endwall by a first distance that is between about 1 mm and about 70 mm.

The plurality of anodes may be spaced apart from the micromesh avalanching structure by a second distance that is between about 1 mm and about 70 mm.

The gas may be a propane based or methane based tissue-equivalent counting gas.

The first endwall may have a thickness of between about 1 mm and about 20 mm. In accordance with another broad aspect of the teachings described herein, a method of measuring ionizing radiation may include the steps of:

creating secondary charged particles by passing the ionizing radiation through a tissue-equivalent cathode member forming one endwall of a chamber containing a tissue-equivalent counting gas, the secondary charged particles producing free electrons within the tissue-equivalent counting gas;

drawing the free electrons toward a micromesh avalanching structure member provided within the chamber using an electric field;

multiplying the free electrons with the micromesh avalanching structure;

collecting at least a portion of the multiplied free electrons using at least two anode pads provided within the chamber, each anode pad producing a corresponding anode output signal; and separately recording each anode output signal using a data acquisition system.

The method may also include generating an aggregate output signal based on the at least two anode output signals.

The method may also include comparing the aggregate output signal to a pre-determined conversion table to determine the input quantity of ionizing radiation.

The micromesh avalanching structure comprises at least one gas electron multiplier (GEM).

In accordance with another embodiment of the teachings disclosed here, a method of measuring ionizing radiation may include the steps of:

creating charged particles;

causing the charged particles to generate the free electrons;

collecting at least a portion of the free electrons using at least two anode pads provided within the chamber, each anode pad producing a corresponding anode output signal, to provide higher sensitivity; and recording each anode output signal.

The method may include drawing the free electrons toward a micromesh avalanching structure member provided within the chamber using an electric field, and multiplying the free electrons with the micromesh avalanching structure.

The micromesh avalanching structure may include at least one gas electron multiplier (GEM).

In accordance with another aspect of the teachings disclosed herein, a method of measuring ionizing radiation may include:

a) creating secondary charged particles (protons and/or electrons) by passing the ionizing radiation through a tissue-equivalent cathode member forming one endwall of a chamber containing a tissue-equivalent counting gas, the secondary charged particles producing free electrons within the tissue-equivalent counting gas;

b) drawing the free electrons toward a micromesh avalanching structure member provided within the chamber using an electric field;

c) multiplying the free electrons with the micromesh avalanching structure;

d) collecting at least a portion of the multiplied free electrons using at least two anode pads provided within the chamber, each anode pad producing a corresponding anode output signal; and e) recording each anode output signal.

The method of claim 22, wherein the micromesh avalanching structure comprises at least one gas electron multiplier (GEM).

DRAWINGS

The drawings included herewith are for illustrating various examples of articles, methods, and apparatuses of the teaching of the present specification and are not intended to limit the scope of what is taught in any way.

In the drawings:

FIG. 1 is a partially cut-away schematic perspective view of a portion of a detection apparatus;

FIG. 2 is a partially exploded view of the detection apparatus of FIG. 1;

FIG. 11 is a partially cut-away schematic perspective view of a portion of a another example of a detection apparatus;

FIG. 12 is a partially exploded view of the detection apparatus of FIG. 11;

DETAILED DESCRIPTION

Figure 3:
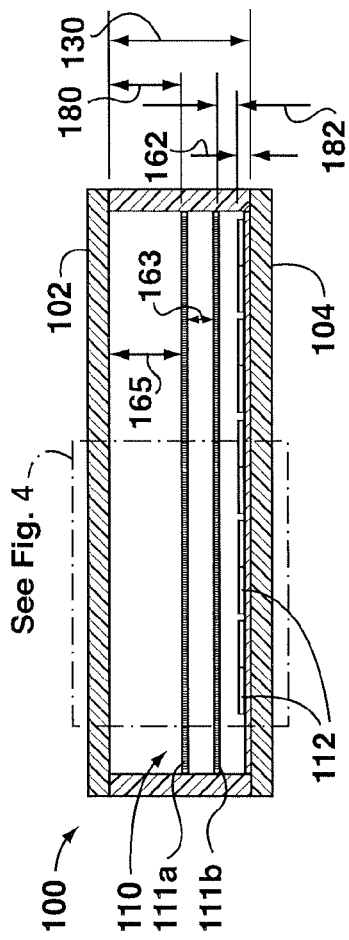
FIG. 3 is cross-sectional view of the detection apparatus of FIG. 1, taken along line 3-3 in FIG. 1.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Monitoring the amount of radiation to which a person is exposed can be one aspect of radiation protection. A limiting quantity in radiation protection to an individual is the effective dose equivalent, $H_E$, of radiation received by the individual. However, in some situations this quantity may not be directly measurable, for example because of the variable quality of incident neutron radiation. This quality is expressed by radiation weighting factors (in the effective dose).

A Tissue Equivalent Proportional Counter (TEPC) is an instrument that can be used to measure radiation doses when placed in an environment that is subjected to incoming radiation. Conventional TEPCs can be used to provide lineal energy transfer (LET) spectrum for some types of ionizing radiation (e.g. α, β, gamma radiation), and can help to measure the doses of these types of radiation with relatively high accuracy. However, known TEPCs tend not to have a satisfactory sensitivity with respect to neutron radiation. Typically, the neutron sensitivity of conventional TEPCs is low due to the low elastic scattering cross section of neutrons in matter. In a conventional TEPC the ionization events take place due to elastic scattering of neutrons in tissue equivalent material. The cross section of such interactions is quite small. Therefore the sensitivity of the conventional TEPCs to neutrons is typically quite low. Providing a radiation detecting apparatus with an improved sensitivity to neutron radiation may allow for more precise determinations of neutron radiation doses within a given environment.

Referring to FIG. 1, a schematic representation of one embodiment of a radiation detection apparatus 100 is illustrated. Portions of the apparatus 100 have been cut-away in the image provided to reveal the interior of the apparatus 100.

In the illustrated embodiment, the radiation detection apparatus 100 includes a first endwall 102, a second endwall 104 and sidewalls 106 extending therebetween. Together, the first endwall 102, second endwall 104 and sidewalls 106 cooperate to form a chamber 108 that surrounds and encloses an interior volume (see also FIG. 2). A micromesh avalanching structure 110 is provided within the chamber 108 and is positioned between the first and second endwalls 102 and 104. The interior volume of the chamber 108 is configured to hold a gas, and can be referred to as defining a gas volume.

The micromesh avalanching structure 110 can be any suitable apparatus that is able to collect electrons from within the interior volume of the chamber 108 and initiate an electron avalanche. Referring to FIG. 2, in the illustrated example, the micromesh avalanching structure 100 includes two Gas Electron Multipliers (GEMs), an upper GEM 111a and a lower GEM 111b positioned within the chamber 108. Alternatively, instead of two GEMs the radiation detection apparatus 100 may include one GEM, more than two GEMs or may include another suitable avalanche apparatus, such as, for example, one or more thick GEMs and/or one or more micromegas Using a single GEM may increase the risks that the apparatus will suffer from discharge and sparking damage as a result of the relatively large number of primary electrons that are generated by the heavily ionizing particles passing the detector. With a multi-GEM configuration, it is believed that a higher gain can be achieved than can be achieved using a single GEM. Furthermore, a given gain can be achieved at lower operating voltages across each individual GEM, because the gas multiplication process is shared between the multiple GEMs provided in the apparatus. Reducing the operating voltage required for each GEM may help facilitate safer operation of the apparatus. The number of GEMs used within a multi-GEM apparatus can vary from two to three, or more.

A thick GEM is understood to be a GEM that is made of thicker foil than a standard GEM (e.g. a foil having a thickness greater than 50 microns), and may have a thickness in the sub mm to mm order. A thick GEM may also have larger diameter holes than the GEMs 111a and 111b illustrated herein. In a micromegas based detector apparatus the gas volume can be divided by a metallic micro-mesh that is placed between about 25 μm and about 150 μm above the pads 112.

The use of micromesh avalanching structures in combination with the pads 112 separates the charge multiplication stage (via the micromesh avalanching structure) from the charge collecting stage (via the pads 112). This is in contrast to other structures, such as MSGC, μ-PIC in which the charge multiplication and charge collection functions are provided in a single stage. Separating the charge multiplication stage from the charge collection stage may help improve performance of the detection apparatus.

Figure 4:
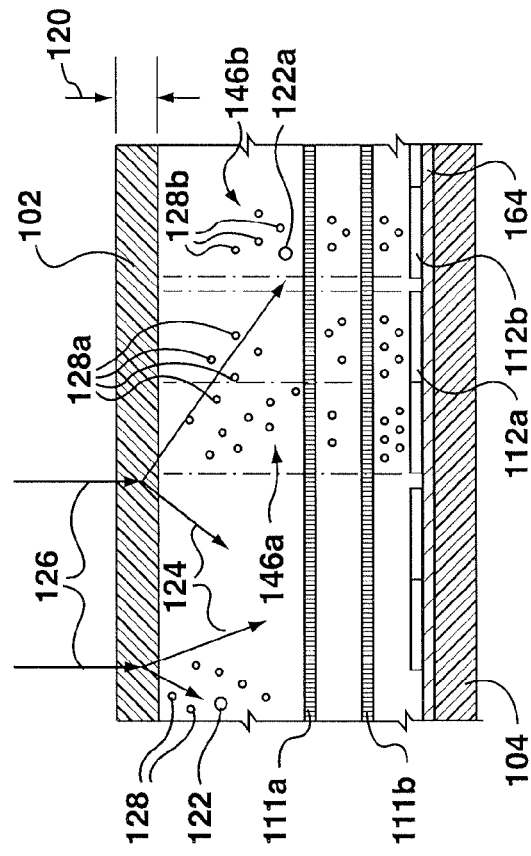
FIG. 4 is an enlarged view of a portion of FIG. 3.

A plurality of detection pads 112 are also positioned within the chamber 108. Referring to FIGS. 2 and 4, in the example illustrated, the plurality of detection pads 112 are spaced apart from the avalanche structure 110 and are provided on the second endwall 104. In this configuration, the avalanche structure 110 (i.e. GEMs 111a and 111b) overlies the detection pads 112 in a first, vertical direction (as illustrated) and is positioned vertically between the detection pads 112 and the first endwall 102.

In the illustrated embodiment, all of the detection pads 112 are in communication with the interior of the chamber 108 and are provided within the same gas volume. The detection pads 112 are not separated from each other by a dividing wall or other type of partition. Alternatively, the chamber 108 may include a divider or partition that separates the interior of the chamber 108 into two or more separate gas volumes, and at least some of the detection pads 112 may be provided within each gas volume.

The radiation detection apparatus 100 is configured to be subjected to or exposed to ionizing radiation, including, for example, neutron radiation. Preferably, at least one wall of the chamber 108 is formed from a material that generates secondary charged particles (such as, for example, protons, alpha particles and heavy ions such as Carbon, Nitrogen and Oxygen) within the chamber 108 when subjected to the incoming ionizing radiation. Such secondary charged particles can then be measured, directly or indirectly, to determine the amount of ionizing radiation received by the radiation detection apparatus. The material that generates secondary charged particles can be any suitable material, and optionally may be any suitable tissue-equivalent material. Using a tissue equivalent material may help enable the radiation detection apparatus to record a radiation dosage that is representative of the dosage a human would receive if subjected to the same incoming ionizing radiation.

Optionally, one endwall of the radiation detection apparatus 100 may be formed entirely, or substantially entirely, from the material that generates secondary charged particles. This may simplify construction of the detection apparatus. It may also help maximize the available surface area (in the illustrated example the surface area of the first endwall 102) that is exposed to the incoming ionizing radiation. This may help improve the effectiveness of the detection apparatus 100. Alternatively, the endwall of the detection apparatus may be formed from a combination of the material that generates secondary charged particles and other materials.

In the illustrated embodiment, the first endwall 102 is formed from A150 tissue equivalent plastic. A150 plastic can simulate soft body tissues, such as muscle, and is suitable for use with respect to ionizing radiation in the form of photons and/or neutrons over a wide range of energies. Alternatively, a different material may be used. For example, the choice of material selected may be based on the nature of the ionizing radiation to be measured, as well as the mechanical and structural properties of the material.

Referring to FIG. 4, the first endwall has a thickness 120. The thickness 120 may be any suitable distance and may be based on the nature of the material used to form the first endwall 102. Optionally, the thickness 120 may be between about 1 mm and about 20 mm or more (e.g. between about 0.050 inches and about 0.08 inches or more), and optionally may be between about 2 mm and about 5 mm.

When the A150 tissue equivalent plastic is subjected to incoming ionizing radiation, the material in the first end wall 102 is ionized, thereby producing a plurality of secondary charged particles. In the example illustrated, when the first endwall 102 is subjected to incoming neutron radiation, illustrated using reference character 126, secondary charged particles in the form of protons, illustrated using reference character 122 are knocked out of the A150 plastic. In addition to generating protons 122, a portion of the incoming ionizing radiation 124 may pass through and/or be scattered by the first endwall 102.

In the illustrated example, the protons 122 ejected from the first endwall 102 can travel through the interior of the chamber 108, which may be filled with any suitable gas. Optionally, the gas filling the chamber 108 may be a tissue-equivalent counting gas, including, for example, propane or propane-based gases, methane, methane-based gases, helium, isobutene, argon, xenon, carbon dioxide and mixtures thereof. Using a suitable tissue-equivalent counting gas may allow the gas to react in a manner that is similar to human tissue.

As the protons 122 move through the tissue-equivalent counting gas the gas can be ionized, thereby producing a plurality of electrons 128 within the gas volume. The number of electrons 128 generated within the chamber 108 may be generally proportional to the number of protons 122 and/or the energy of the protons 122 within the gas volume.

Figure 5:
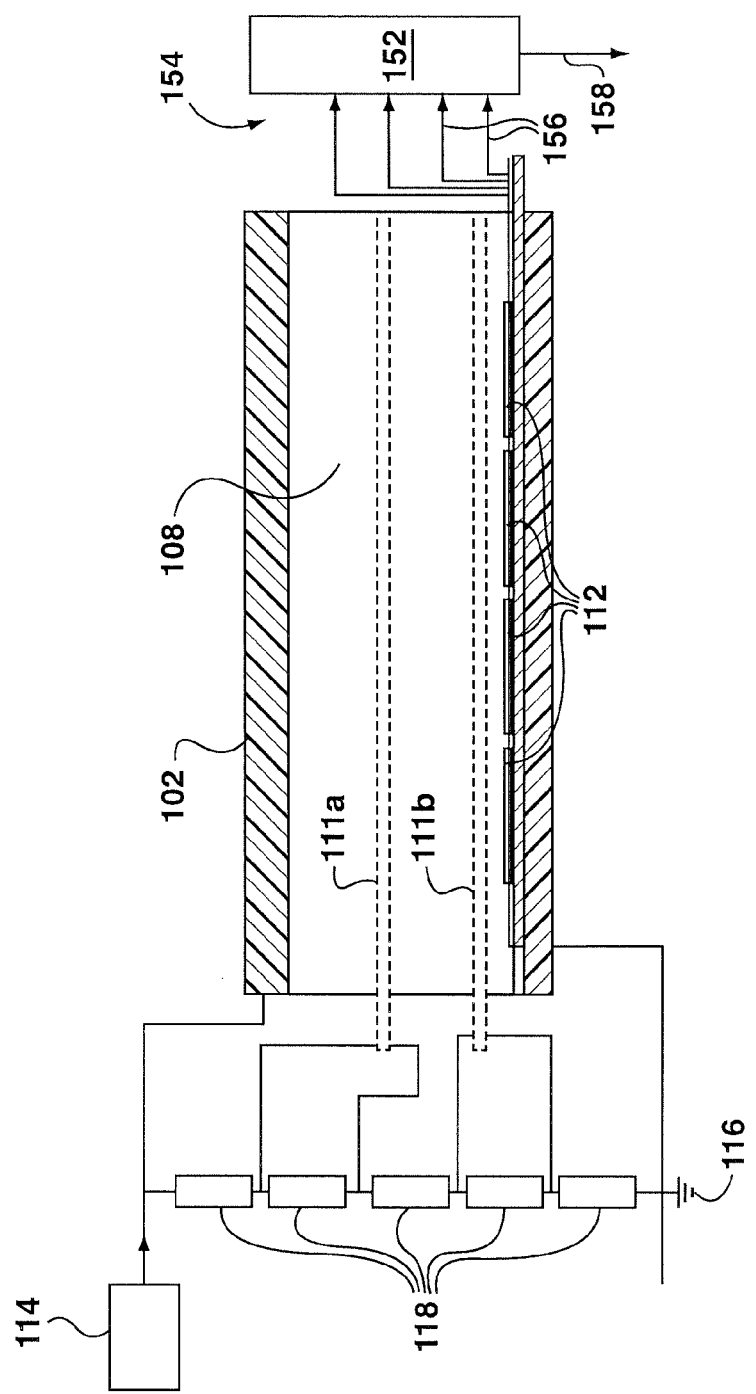
FIG. 5 is a schematic representation of a portion of the detection apparatus of FIG. 1.

In the illustrated example, the first endwall 102 is configured to function as a cathode (e.g. a drift cathode or drift plane) and the detection pads 112 are configured to function as anodes. A voltage can be applied between the first endwall 102 and the detection pads 112 to create an electric field within the chamber 108 (FIG. 5). The voltage is applied between drift plane (A150 plastic) and ground 116 by the power source 114. The particular voltage applied across each component in the detection apparatus 100 can be selected by altering the properties of resistors 118, or by optionally using a different wiring configuration. In the illustrated example, the detection apparatus 100 includes two GEMs 111a and 111b. Using two GEMs in the illustrated configuration may help reduce the voltage that needs to be applied across each individual GEM 111a and 111b, while still achieving a desired overall degree of electron avalanching. These voltages determine the electric field strengths. One example of a suitable spacing between the detection apparatus 100 components in a two GEM configuration, and suitable electric fields/voltages applied across the components is presented in a Table 1.

TABLE 1

Resistors and voltage values for TEPC with a double GEM (for 1760 V total)

| Interval | Typical Spacing | Resistor Value | Typical Voltage (Electric field) |
|---|---|---|---|
| Anode readout to bottom of lower GEM (distance 182 in FIG. 3) | 1.5 mm | R1 = 6 MΩ | 600 V (4 kV/cm) |
| Bottom to top of lower GEM | | R2 = 4 MΩ | 400 V |
| Top of lower GEM to bottom of upper GEM (distance 163 in FIG. 3) | 2 mm | R3 = 2.6 MΩ | 260 V (1.33 kV/cm) |
| Bottom to top of upper GEM | | R4 = 4 MΩ | 400 V |
| Top of upper GEM to drift plane (distance 165 in FIG. 3) | 2 mm | R5 = 1 MΩ | 100 V (0.5 kV/cm) |

While one example is illustrated above, in other examples, the voltage applied across each avalanching structure may be between about 250 and about 500 volts, and optionally may be more than 500 volts if the avalanching structure is configured to operate at higher voltages. For example, in a two GEM configuration (as illustrated) the voltage across each GEM 111a and 111b may be between about 250 and about 500 volts (400V each in the example illustrated), and therefore the total voltage applied to the micromesh avalanching structure 110 may be between about 500 volts and about 1000 volts.

The electric field is configured to draw electrons downward (as illustrated) toward the GEMs 111a and 111b and the anodes (pads 112).

In the illustrated embodiment, the interior of the chamber 108 is filled with a propane-based tissue-equivalent counting gas that has the following composition 55% of $C_3H_8$, 39.6% of $CO_2$, 5.4% of $N_2$ by volume, or elemental composition H—0.102672; C—0.568940; N—0.035022; O—0.293366 by weight. As the protons 122 travel through the counting gas some of the gas molecules are ionized, producing electrons 128 within the chamber 108. Due to the electric field within the chamber, the electrons 128 are drawn downward (as illustrated) toward the detector pads 112 and the GEMs 111a and 111b covering the detector pads 112.

Referring to FIG. 3, in the illustrated embodiment the first and second endwalls 102, 104 are spaced apart from each other by a height 130. The height 130 may be any suitable distance, including, for example, between about 0.5 cm and about 10 cm or more, and may be between about 1 cm and about 3 cm.

Referring also to FIG. 1, the avalanche structure 110, including the Gas GEMs 111a and 111b is provided within the interior of the chamber 108, and is positioned between the first and second endwalls 102 and 104. The GEMs 111a and 111b may be supported using any suitable mechanism or means, and in the example illustrated are coupled to the sidewalls 106. The GEMs 111a and 111b may be any suitable GEM that is operable to multiply the incoming electrons, via electron avalanche. Optionally, the GEMs 111a and 111b can be sized so that they each cover substantially the entire cross-sectional area of the detection apparatus 100, and cover all of the detector pads 112. For example, if the first endwall 102 is a generally square plate having a length 132 of 10 cm and a width 134 of 10 cm (FIG. 2), the GEMs 111a and 111b may also be generally square shaped and may have a length of about 10 cm and a width of about 10 cm.

The GEMs 111a and 111b (or other suitable avalanche structure) can be positioned at any suitable elevation or height within the chamber 108. Optionally, the avalanche structure 110 may be positioned closer to the second endwall 104 than the first endwall 102. Referring to FIG. 3, in the illustrated embodiment, the avalanche structure 110 is offset from the first endwall 102 by a distance 180, which may be understood to be the distance between the first endwall 102 and the closest surface of the avalanche structure 100 (the upper surface of the upper GEM 111a in the illustrated example). The distance 180 may be any suitable distance, and may be between about 1 mm and about 70 mm or more, and the individual GEMs 111a and 111b can be spaced apart from each as set out in Table 1, or at another suitable spacing.

The avalanche structure 110 may be offset from the second end wall 104 by a distance 182, which may be understood to be the distance between the second endwall 104 and the closest surface of the avalanche structure 100 (the lower surface of the lower GEM 111b in the illustrated example). The distance 182 may be any suitable distance, and may be between about 1 mm and about 70 mm or more. Optionally, the distance 182 may be less than the distance 180, and may be between about 10% and about 50% of the distance 180. Alternatively, the distance 182 may be less than 10% of the distance 180 or may be more than 50% of the distance 180.

Figure 2A:
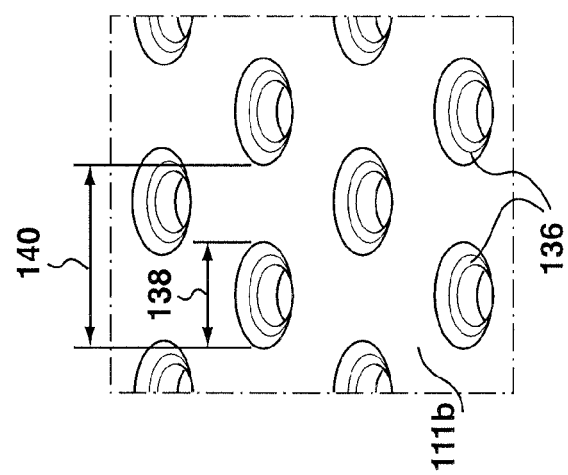
FIG. 2A is an enlarged view of a portion of the detection apparatus of FIG. 2.

Referring to FIG. 2A, in the illustrated example, the GEMs 111a and 111b are each formed from a copper coated Kapton foil (on both sides), perforated with any suitable high density of holes 136 (see FIG. 2A—for example between about 50 and about 100 holes per mm$^2$). Etched in a photolithographic process, these holes 136 may have any suitable diameter 138, and in the example illustrate have diameters 138 of about 70 µm. The holes 136 are usually spaced with a suitable pitch 140, which in the illustrated embodiment is about 140 µm (standard geometry). The application of a potential difference between the upper and lower copper layers 142, 144 (shown with respect to the lower GEM 111b in FIG. 2) of the GEMs 111a and 111b creates a relatively high electric field inside the holes 136. Electrons 128 produced in the upstream part of the GEMs 111a and 111b can be guided into these holes 136, where they undergo Townsend avalanche multiplication. The multiplication of the electrons 128 may result in effective gains in excess of two orders of magnitude per GEM 111a and 111b. The total effective gain obtained with such a detector 100 can be adapted to the needs of the application by choosing a desired number of GEMs in the micromesh avalanching structure 110 by selecting a desired voltage across each GEM.

Providing the avalanche structure 110 within the chamber amplifies the number of electrons 128 provided downstream from (i.e. below) the avalanche structure 110 that reach/contact the detector pads 112. Increasing the number of electrons 128 that reach the detector pads 112 may help increase the electrical charge received by the detector pads 112, which may help increase the sensitivity of the detection apparatus 100. This may also help increase the signal to noise ratio of the electrical signals output by the detection apparatus 100, which may help improve its ability to measure neutron radiation doses. Optionally, additional GEMs may be provided in the chamber, which may help to provide further amplification, improvement in signal to noise ratio, and overall sensitivity.

In the illustrated embodiment, the stages of avalanche multiplication and charge collection are different than those in conventional TEPCs. In the illustrated example, a voltage is applied between anode (detection pads 112) and drift cathode (first end wall 102) to create an electric field that draws the electrons towards the avalanche structure 110. A high voltage is applied to the avalanche structure 110, so that electrons coming into the holes of the GEMs 111a and 111b undergo a Townsend avalanche multiplication. Those multiplied electrons are collected by the detection pads 112 and read out as an electronic pulse.

Referring to FIG. 4, in the illustrated embodiment, the physical location within the chamber where the electrons are generated is based on the location, direction of travel and energy of the protons 122 emitted from the first endwall 102. In the illustrated configuration, a given proton, for example proton 122a may pass over one or more separate detection pads, such as pads 112a and 112b as illustrated, as it moves within the chamber 108. In this configuration, the column of gas overlying each pad 112 may provide a respective detection volume 146 overlying each pad 112. Electrons present within a given detection column 146 may tend to be measured using the corresponding pad 112. Each detection volume 146 can be thought of as functioning as an independent TEPC. In this configuration, the sensitivity of the detection apparatus 100 may be increased, perhaps generally linearly, based on the number of separate detection volumes 146 provided within the common gas chamber 108. In the illustrated example, the columns or volumes of gas 146a and 146b (showing using dashed lines) above each detection pad 112a and 112b respectively, extending upwardly from each detection pad 112a and 112b and generally toward or to the first endwall 102, are examples of detection volumes 146 associated with each detection pads 112a and 112b respectively.

Electrons 128 that are generated within a given detection volume 146 tend to be driven toward the associated detection pad 112 via the electric field within chamber 108. As they pass through the GEMs 111a and 111b the electrons 128 will be multiplied to increase the total charge received by the corresponding detection pad 112, and the charge captured by the detection pad may still be generally proportional to the number of electrons 128 generated within its detection volume 146. Providing the detection pads 112 in a two-dimensional matrix or array 150 (FIG. 2) as illustrated may provide the ability to re-construct a two-dimensional projection of a given proton's 122 track through the chamber 108. This may be useful in microdosimetric research and/or medical applications. For example, referring to FIG. 4, the electrons 128a generated by proton 122a within detection volume 146a may be drawn downwards, multiplied by the GEMs 111a and 111b and may be recorded by detection pad 112a, while electrons 128b generated by proton 122a within detection volume 146b may be drawn downwards, multiplied by the GEM s 111a and 111b and may be recorded by detection pad 112b. By analyzing the electrical signals from pads 112a and 112b, is may be possible to determine that proton 122a passed over both pads 112a and 112b.

If a proton is moving laterally with sufficient speed/energy, it is possible that the proton may pass through two or more different detection volumes 146 (as described above). In such instances, the proton may deposit only a portion of its energy within each detection volume 146, but measuring the energy within the multiple adjacent detection volumes 146, such as volumes 146a and 146b as illustrated, may help increase the overall fraction of the proton's energy that is measured by the detection apparatus 100, for example as compared to a TEPC with a single anode. Capturing and measuring a larger amount of the energy deposited by each proton 122 within the chamber 108 may help improve the sensitivity of the detection apparatus.

Optionally, the charge received by each detection pad 112 can be separately monitored using any suitable data acquisition system. Referring to FIG. 5, in the illustrated example, a schematic representation of data acquisition system 154 includes a multi-channel controller 152 that is connected to each detection pad 112 by a corresponding electrical connection 156. While only four pads 112 and connections 156 are shown in FIG. 5 for clarity, an electrical connection can be provided for each detection pad 112 in the apparatus 100. In this configuration, the controller 152 may have a discrete input that is connected to each detection pad 112, and is configured to separately monitor the charge/electrical signal output by each detection pad 112. Optionally, the controller 152 may be configured to combine the signal from each detection pad 112 to provide a combined or aggregate output signal 158. Combining individual signals from multiple detection pads 112 to provide a combined output signal 158 may help increase the sensitivity of the detection apparatus 100. The output signal 158 can then be converted into dosimetric quantities using appropriate equations and conversion factors. By such a conversion (or other suitable process) the electrical output signal 158 may be used to determine the amount of incoming ionizing radiation.

Optionally, the connections to the pads 112 can be multiplexed to help reduce the number of output connections 156, and in some configurations the number of output connections 156 may be less than the number of pads 112. Multiplexing the pads 112 is one manner in which the number of output connections 156 can be reduced. That is, more than one pad 112 can be connected to a given data acquisition channel, i.e. the output connection 156. For example if a GEM has an area of about 10000 mm$^2$ (10 cm×10 cm) it may include a large number of pads 112, (e.g. about 2940 readout pads 112). If a one-to-one ratio is used (as illustrated in the exemplary embodiment), 2940 pads 112 would require 2940 data output connections 156, each with appropriate components, such has preamplifiers and amplifiers. This may increase the cost and complexity of the apparatus and may present a challenge for the portability of the apparatus. This issue can be partially resolved by using the same data acquisition channel 156 for multiple readout pads 112, such as, for example, pads 112 that are separated from each other by a distance that is larger than an expected maximum track length of a proton in the gas.

Optionally, the signals from different detection pads 112 may also be compared with each other. Comparing the signals from different detection pads 112 within the chamber 108 may allow the additional characteristics of the incoming radiation to be determined.

Optionally, the detection pads 112 may be of any suitable shape, size and configuration. Preferably, the detection pads 112 are generally flat, planar pads having a width 160 in the lateral direction that is substantially greater than their height 162 (in the vertical direction as illustrated in FIGS. 2 and 3). For example, the detection pads may be circular, square, chevron-shaped, rectangular, triangular, hexagonal, and/or may be any other suitable shape. The pads may be formed from any suitable, electrically conductive material, including, for example copper and aluminum. In the illustrated example, the pads 112 are formed from copper.

Any suitable number of detection pads 112 may be provided within the chamber 108. Optionally, the detection pads 112 may be positioned to cover substantially all of the interior surface of the second endwall 104. Alternatively, the detection pads may cover only a portion of the interior surface of the second endwall. Optionally, the detection pads 112 may be individually and directly connected to the second endwall 104. Alternatively, as illustrated, the detection pads 112 may be mounted to a common support substrate 164 (FIG. 2) that can be placed within the chamber 108 and connected to the second endwall 104.

Figure 4A:
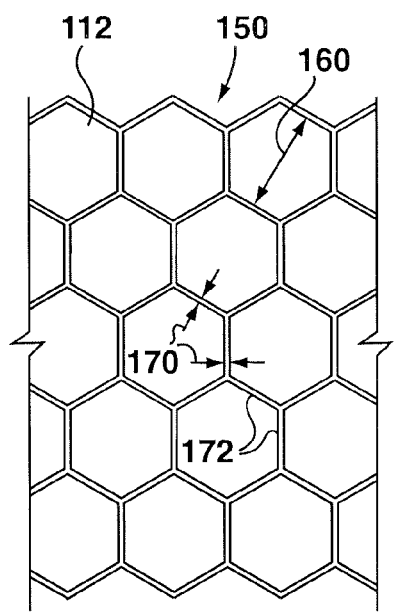
FIG. 4A is an enlarged top view of a portion of FIG. 2.

Optionally, the shape of the detection pads may be selected so that they can at least partially nest with each other to form a generally two-dimensional matrix 150 or array of pads. Referring to FIG. 4A, providing detection pads that can at least partially nest with each other may help reduce the size 170 of the gaps 172 between adjacent detection pads 112. Electrons generated above such gaps 172 may not be captured by any of the detection pads 112, and may therefor go unrecorded. While providing at least some gap 172 between adjacent detection pads 112 helps preserve the detection pads 112 as discrete anodes, minimizing the size 170 of such gaps 172 may help improve overall detection sensitivity and/or performance of the detection apparatus 100.

The shape of the detection pads 112 may also be selected based on their suitability for use with known numerical models, experimental techniques and/or empirical equations. For example, conventional TEPCs are generally spherical and models and equations developed for use with such TEPCs may rely, at least in part, on the spherical geometry. Approximations and modifications can be made to adjust the known techniques to other geometries, including, for example cylindrical TEPCs, however the practicality of such approximations may decrease the further the TEPC volume departs from spherical. For example, providing generally circular or disc-like detection pads may provide generally cylindrical detection volumes over each pad. Such a pattern may be desirable from a modeling and/or analysis perspective. However, circular detection pads may not nest with each other when configured in an array on the interior surface of the second endwall, which may result in undesirable gaps being formed between adjacent detection pads.

Referring to FIG. 4A, in the illustrated embodiment the detection pads 112 are hexagonal in shape, and are nested with each other to form a grid or matrix 150 of detection pads 112 covering most of the interior surface of the second endwall 104 (see also FIGS. 1 and 2). It is believed that a hexagonal shape may provide a suitable compromise between the competing objectives of physical nesting and modeling/analysis practicality. For example, it is believed that hexagonal pads 112 can be nested sufficiently close to each other to reduce the size of the gaps 172 between detection pads while providing a detection volume 146 (i.e. a hexagonal prism extending between a detection pad 112 and the first endwall 102) that can be modeled analyzed using techniques that have been developed with respect to spherical or cylindrical volumes (as opposed to, for example, a triangular prism detection volume which would be further from the cylindrical model).

The detection pads 112 may be of any suitable size. For example, the detection pads may have a pad width 160 in the lateral direction that is between about 0.1 mm and about 10 mm or more, and may be between about 1 mm and about 4 mm. In the illustrated example, the detection pads have width 160 that is about 2 mm. In this configuration, the detection pads 112 are positioned so that the gaps 172 provided between adjacent pads are generally the same width 170 throughout the matrix 150, and the width 170 is selected to be about 0.1 mm. Optionally, the width 170 of the gaps 172 may be greater than or less than 0.1 mm, and for example, may be between about 0.05 mm and about 0.3 mm.

In the illustrated example, the detection pads 112 are generally identical. This may help simplify the analysis of the electrical signals generated by each detection pad 112. Alternatively, the detection pads 112 need not be identical, and may be provided in a variety of different shapes and sizes.

The detection pads 112 may be formed from any suitable material that can function as an anode, and optionally may be mounted to a common mounting substrate 164 as illustrated. In the illustrated example, the detection pads 112 are formed as components on a printed circuit board (PCB). Electrical communication between each detector pad 112 and the controller 152 may be provided using any suitable connector, including conductive pathways, tacks and pathways on the PCB and electrical wires.

To test an embodiment of a radiation detection apparatus, a numerical simulation was performed using MCNPX. In this simulation, a single hexagonal prism was considered. The prism volume with a height of 2 mm and a diameter of 2 mm was filled with tissue-equivalent (TE) gas and was created between an A-150 plastic drift plane (thickness of 3 mm and surface area of about 10 cm×10 cm) and a GEM with an area of about 10 cm×10 cm. The neutron source used was a plain parallel beam, uniformly distributed over the surface area 10 cm×10 cm, and it was oriented generally perpendicular to the A-150 drift plane.

By using the mean chord length of 1.20 mm for a prism, two site sizes (1.1 μm and 0.2 μm) were simulated when scaled for the pressure of the TE gas at 0.5 atm and 0.1 atm according to:

$$L_T = \frac{\rho_g}{\rho_T} L_g \quad \text{Equation 1}$$

In equation 1, $L_T$ is chord length in the simulated tissue, $L_g$ is the chord length in the gas, and $\rho_T$ and $\rho_g$ are the densities of the tissue and gas, respectively.

Figure 6:
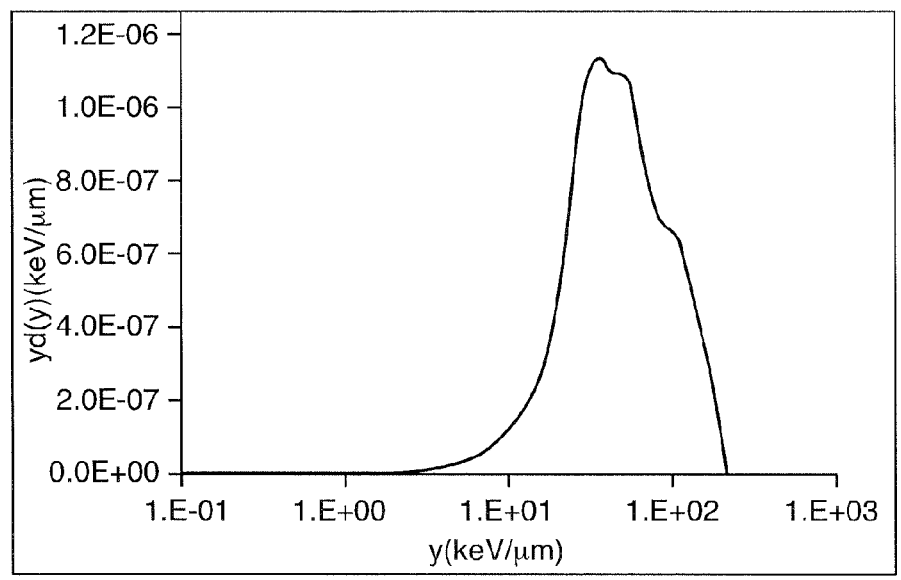
FIG. 6 is plot of a Lineal energy distribution for neutron energy of 3 MeV in 1.1 micron tissue size.

The lineal energy distribution was obtained by obtaining the number of counts in the energy bins. Knowing the mean chord length, lineal energy y can be found. An example of lineal energy distribution for a neutron energy of 3 MeV and for the simulated tissue size of 1.1 μm is shown in FIG. 6, which is a Lineal energy distribution for neutron energy 3 MeV using 1.1 μm tissue size.

Based on the lineal energy distribution, it is possible to calculate the dosimetric quantities and associated sensitivity of the TEPC, based on hexagonal prism volume.

The cumulative sensitivity of the TEPC can be determined by the net effect from all the readout pads. The sensitivity of TEPC as a function the total area is shown in FIG. 7, which is a plot of sensitivity to 3 MeV neutrons as a function of the detector pads' area.

Figure 7:
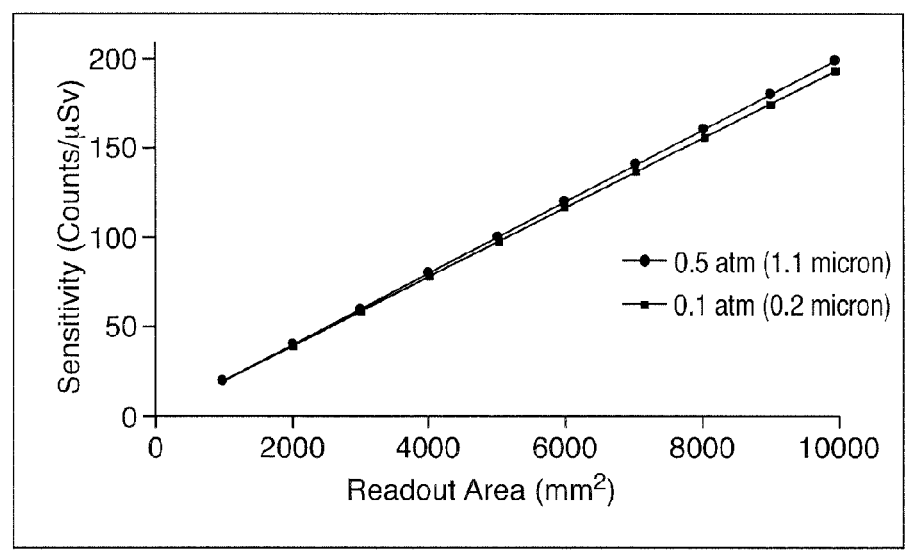
FIG. 7 is a plot of sensitivity to 3 MeV neutrons as a function of the detector pads' area.

As this test was conducted using a single detection pad, it is noted that the sensitivity presented in the FIG. 7 does not include the effect of neighbouring pads. Due to the fact that a recoil proton may cross multiple hexagonal prisms of gas, the same ionization event may be registered multiple times by the neighbouring detection pads. Based on this fact, the effect of neighbouring pads is calculated, assuming that a hexagonal pad is surrounded by other pads, the same way as a single pad is surrounded by 6 other pads in FIG. 8. The results of this computation are presented in Table 2.

TABLE 2

Effect of neighbouring pads on count rate for a single pad

| Neutron Energy (MeV) | Effect of Neighbouring Pads (%) for 0.5 atm (1.1 μm) | Effect of Neighbouring Pads (%) for 0.1 atm (0.2 μm) |
| --- | --- | --- |
| 3 | 50.4 | 49.9 |
| 1 | 47.2 | 55.2 |
| 0.3 | 36.5 | 52.5 |
| 0.1 | 23.2 | 40.8 |
| 0.03 | 14.2 | 26.8 |
| 0.01 | | 16.7 |

As can be seen from the Table 2, the sensitivity of a single pad may increase by between about 15% to more than 50% for certain energies, due to the neighbouring pads.

Figure 8:
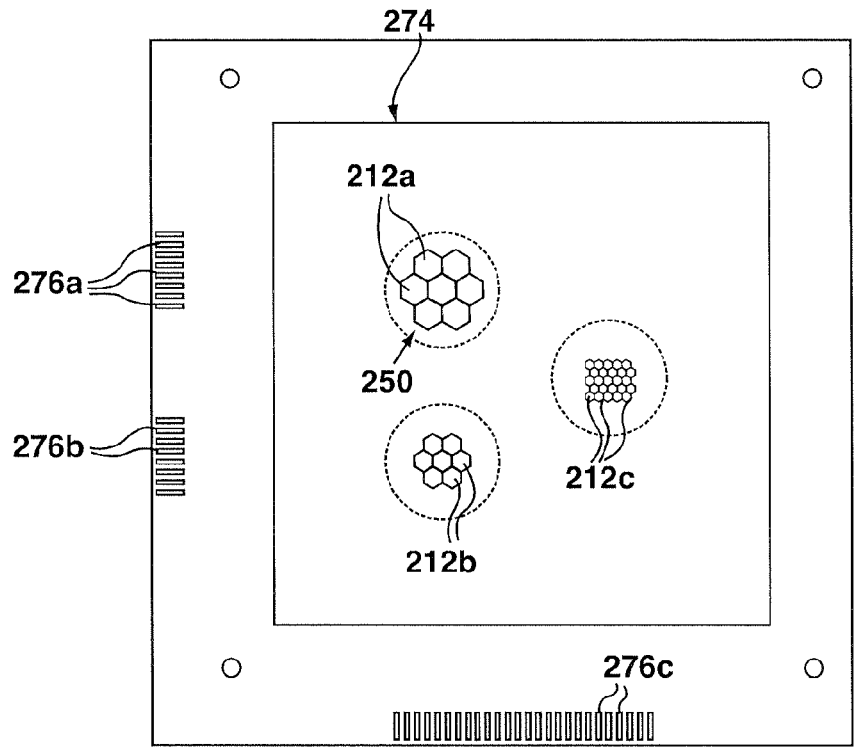
FIG. 8 is a schematic representation of a PCB (printed circuit board with three different detection pad sizes)

A test detection apparatus was constructed and included a detection pad PCB layout, which was configured according to PCB schematics illustrated in FIG. 8. The test apparatus included features that are analogous to the detection apparatus 100, and analogous features are identified using like reference characters indexed by 100. The test drift plane (upper end wall) was made of A150 plastic. Two GEMs stacked on top of each other with 1.5 mm space between them were used to increase the gain. The assembled detector was placed into aluminium vacuum-tight vessel.

In this configuration, the PCB 274 included three sets of detection pads 212a, 212b and 212c. The first set of detection pads included 7 hexagonal detection pads 212a arranged in a matrix 250 configuration as illustrated. Eight (8) contact pads 276a were also provided on the PCB 274. One contact pad 276a was electrically connected to each detection pad 212a, and the eighth contact pad 276a was connected to the ground plane. A similar configuration of hexagonal pads 212b and 212c were provided at other locations on the PCB 274, and suitable contact pads 276b and 276c were incorporated as suitable. While each detection pad 212 can be monitored for testing, as the initial stage of testing, the following tests were conducted by monitoring only one detection pad 212a.

Figure 9:
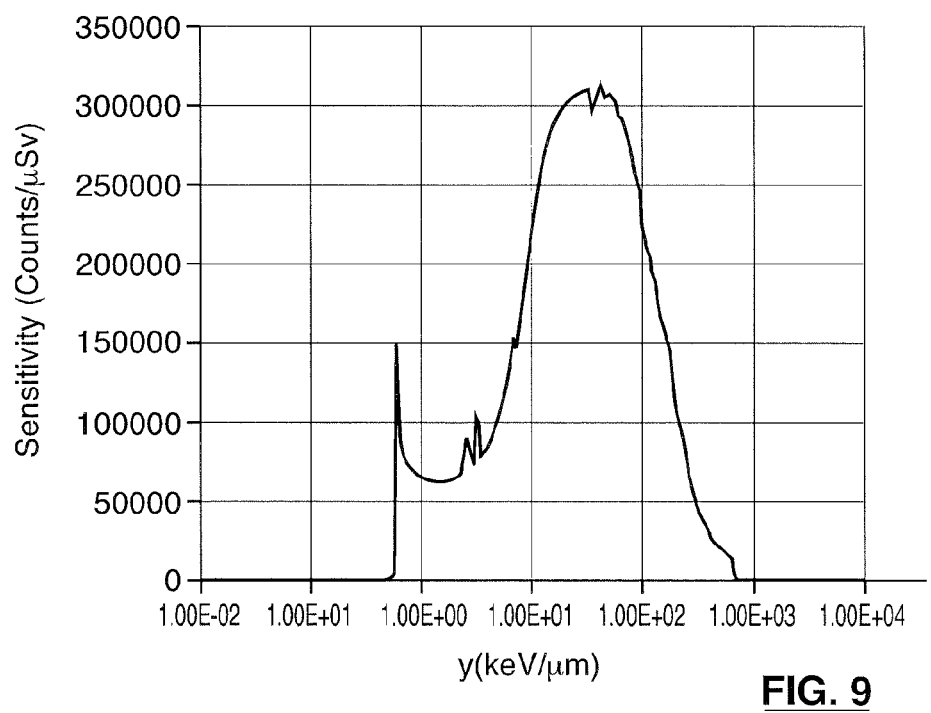
FIG. 9 is an event size distribution for AmBe irradiation of detector filled with 100% of TE gas, with ⅛" lead shielding.

To help screen out external gamma-rays the neutron source was covered/shielded with lead shield (approximately ⅛" of lead). The total applied drift voltage was 1950 V. The result is shown in FIG. 9, which is an event size distribution for AmBe irradiation of detector filled with 100% of TE gas, with ⅛" lead shielding.

The GEM-TEPC was exposed to AmBe neutron source. The measurements enabled the verification of the effect, on the event size spectrum, of the following parameters:
the applied voltage,
effect of the lead shield between the source and the detector on gamma ray response of the detector,
the counting gas composition, and
the gas pressure.

To help identify gamma events in event size distribution of unshielded AmBe source, it may be advantageous to compare it to an event size distribution of gamma-rays from an $^{241}$Am source (without Be), as discussed in J. Dubeau, A. J. Waker, M. Biggar M. D. Rayner, E. W. Sommerville and S. E. Welch *Dosimetric Resposnse to Gamma-Rays and Neutron of a Tissue Equivalent Microstrip Gas Counter* Radiation Protection Dosimetry Vol. 91, No. 4, pp. 391-401 (2000).

Figure 10:
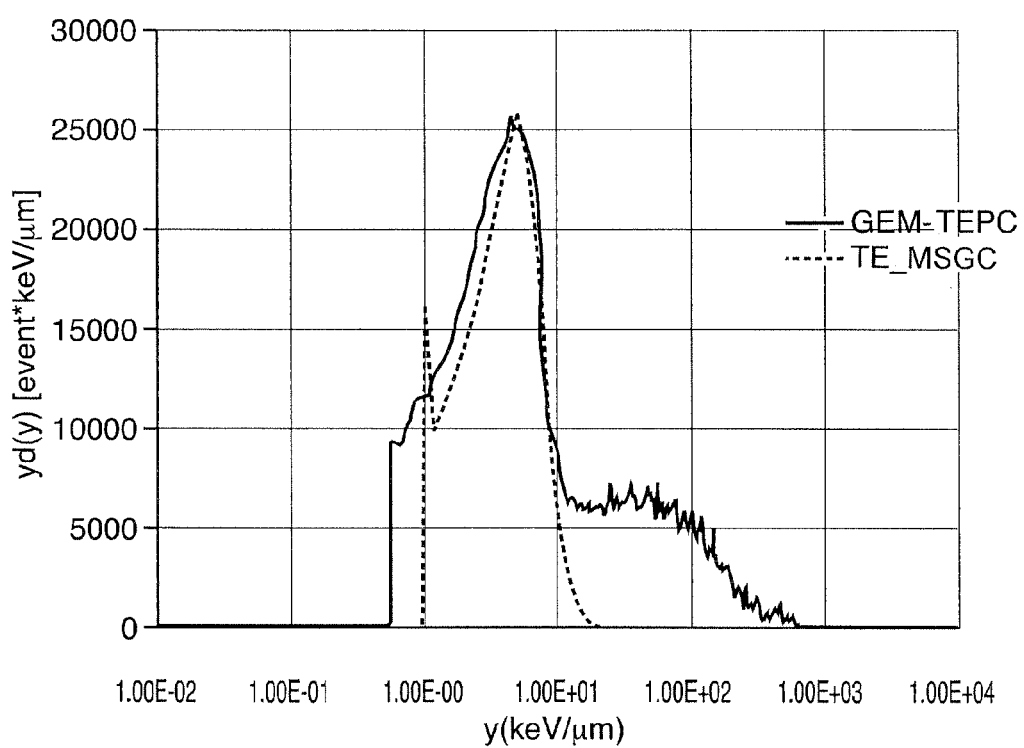
FIG. 10 is a comparison of GEM-TEPC response to unshielded AmBe source and TE-MSGC response to $^{241}$Am source.

Referring to FIG. 10, which is a comparison of GEM-TEPC response to unshielded AmBe source and TE-MSGC response to $^{241}$Am source, shows the data obtained with GEM-TEPC for unshielded AmBe source overlapped with a photon event size spectrum for a pure $^{241}$Am source obtained with TE-MSGC. In addition to positively identifying the photon events of the new GEM-based detector, it can be observed that the GEM-TEPC is able to go much lower in event size down to 0.57 keV/μm. The TE-MSGC had a detection threshold of 1 keV/μm. This shows that GEM-TEPC is running with a relatively high gain.

Referring to FIG. 11, another example of a detection apparatus 1000 illustrated. The detection apparatus 1000 is analogous to the detection apparatus 100, and like features are identified using like reference characters indexed by 1000. In the illustrated example, the detection apparatus 1000.

In the illustrated embodiment, the radiation detection apparatus 1100 includes a first endwall 1102, a second endwall 1104 and sidewalls 1106 extending therebetween. Together, the first endwall 1102, second endwall 1104 and sidewalls 1106 cooperate to form a chamber 1108 that surrounds and encloses an interior volume. A micromesh avalanching structure 1110, in the form of a single GEM 1111 is provided within the chamber 1108 and is positioned between the first and second endwalls 1102 and 1104. In the illustrated embodiment, all of the detection pads 2112 are in communication with the interior of the chamber 2108 and are provided within the same gas volume.

Figure 14:
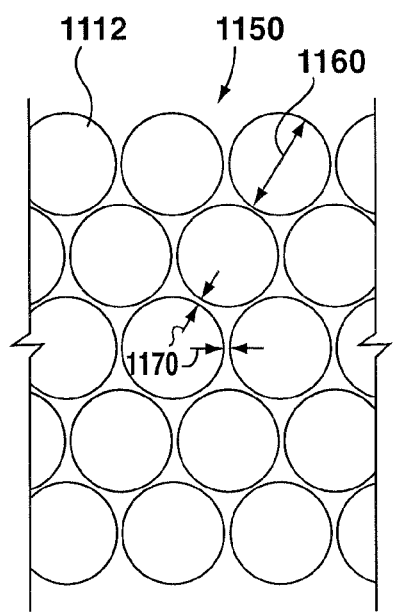
FIG. 14 is an enlarged top view of a portion of FIG. 12.

Referring to FIG. 12, in this embodiment the pads 1112 are generally circular, disc-like members arranged in a matrix 1150 and separated from each other by a gap distance 1170. Referring also to FIG. 14, each pad has a height 1162 and a diameter 1160, which may be generally similar to the height and width of the hexagonal pads 112 (FIGS. 3 and 5).

Figure 13:
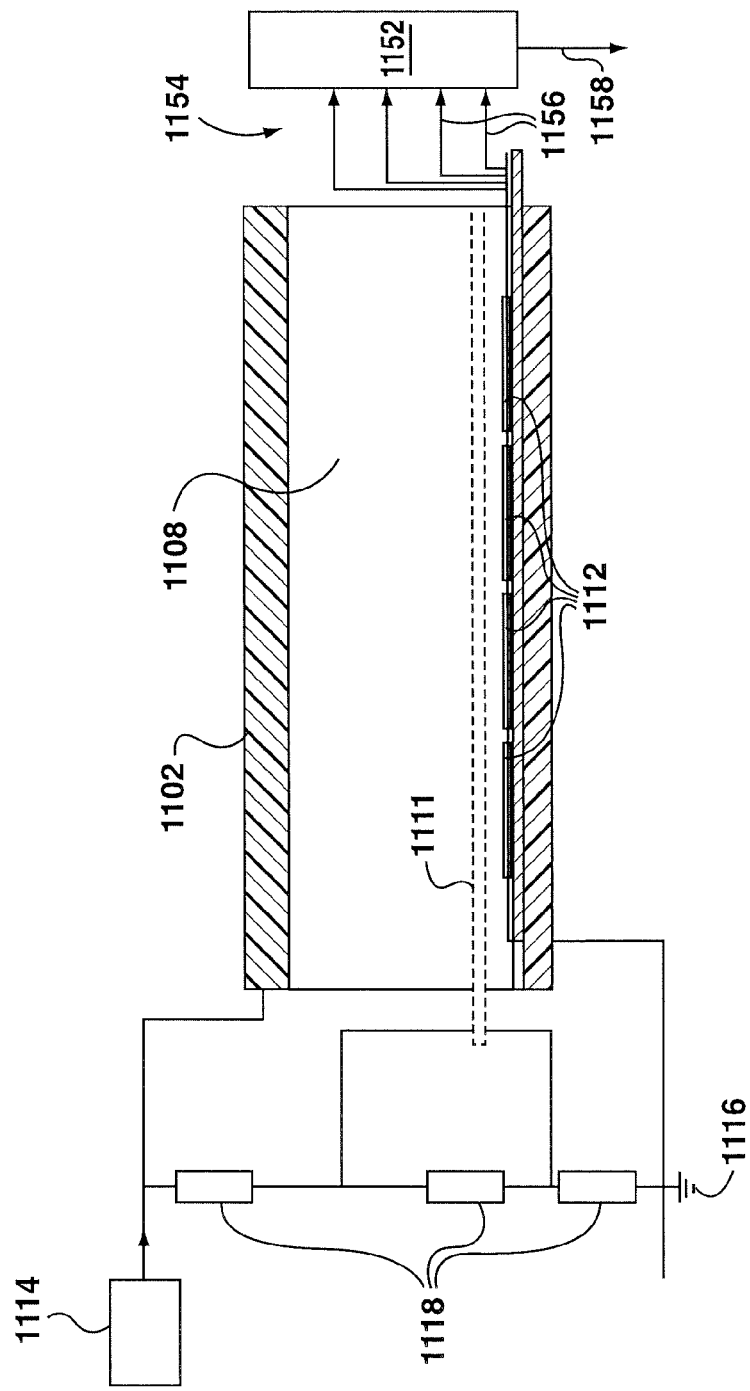
FIG. 13 is a schematic representation of a portion of the detection apparatus of FIG. 11.

Referring to FIG. 13, in the illustrated example, the first endwall 1102 is configured to function as a cathode (e.g. a drift cathode or drift plane) and the detection pads 1112 are configured to function as anodes. A voltage can be applied between the first endwall 1102 and the detection pads 1112 to create an electric field within the chamber 1108. The voltage is applied between drift plane (A150 plastic) and ground 1116 by the power source 1114. The particular voltage applied across each component in the detection apparatus 1100 can be selected by altering the properties of resistors 1118, or by optionally using a different wiring configuration. In the illustrated example, the detection apparatus 100 includes a single GEM 1111. Optionally, the charge received by each detection pad 1112 can be separately monitored using any suitable data acquisition system. Referring to FIG. 14, in the illustrated example, a schematic representation of data acquisition system 1154 includes a multi-channel controller 1152 that is connected to each detection pad 1112 by a corresponding electrical connection 1156. While only four pads 1112 and connections 1156 are shown in FIG. 14 for clarity, an electrical connection can be provided for each detection pad 1112 in the apparatus 1100.

In a single GEM configuration, the voltage applied between the pads 112 and the first endwall 1102 may be between about 50 and about 200 volts.

What has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A tissue-equivalent proportional counter apparatus comprising:
    a) a first endwall, a second endwall spaced apart from the first endwall and sidewalls extending therebetween to provide an enclosed chamber interior containing a tissue-equivalent counting gas, the first endwall being a cathode and formed from a tissue-equivalent material that is operable to produce secondary charged particles within the chamber when exposed to ionizing radiation, the secondary charged particles producing electrons within the tissue-equivalent counting gas;
    b) a micromesh avalanching structure provided within the chamber and positioned between the first endwall and the second endwall;
    c) a plurality of anode pads provided within the chamber interior whereby secondary charged particles can travel within the chamber interior from a volume overlying one of the anode pads to a volume overlying an adjacent one of the anode pads without travelling through an intervening solid structure, the plurality of anode pads being spaced apart from the micromesh avalanching structure and arranged in a two-dimensional array positioned between the micromesh avalanching structure and the second endwall, each anode pad configured to collect at least a portion of the electrons produced in the chamber interior and passing through the micromesh avalanching structure and generate a corresponding anode output signal; and
    d) a power source applying a voltage between the cathode and the plurality of anodes; and
    e) a data acquisition system configured to detect the anode output signals and to determine a dose of ionizing radiation corresponding to each anode output signal.

2. The apparatus of claim 1, wherein the micromesh avalanching structure comprises one or more gas electron multipliers (GEM).

3. The apparatus of claim 1, wherein the micromesh avalanching structure comprises at least three gas electron multipliers (GEM) stacked on top of each other.

4. The apparatus of claim 1, wherein the first endwall is formed from A-150 conducting plastic.

5. The apparatus of claim 1, wherein each pad is substantially planar, hexagonal and is laterally spaced apart from each adjacent pad by an offset distance that is between about 0.05 mm and about 0.3 mm.

6. The apparatus of claim 1, wherein each pad has a respective pad width that is between about 0.1 mm and about 10 mm.

7. The apparatus of claim 1, further comprising a data acquisition apparatus having a plurality of inputs, each input connected to at least one of the plurality of anodes to receive the corresponding anode output signal.

8. The apparatus of claim 1, wherein the micromesh avalanching structure is offset from the first endwall by a first distance that is between about 1 mm and about 70 mm and wherein the plurality of anodes are spaced apart from the micromesh avalanching structure by a second distance that is between about 1 mm and about 70 mm.

9. The apparatus of claim 1, wherein the first endwall has a thickness of between about 1 mm and about 20 mm.

10. The apparatus of claim 1, wherein a voltage applied across the micromesh avalanching structure is between about 250 and about 500 volts.

11. The apparatus of claim 1, further comprising a plurality of discrete detection volumes defined within the chamber interior and configured to function as independent tissue-equivalent proportional counter apparatuses, wherein one of the plurality of detection volumes extends upwardly from each one of the plurality of anode pads.

12. The apparatus of claim 11, wherein the plurality of detection volumes are in fluid communication with each other such that one secondary charged particle can travel from a first detection volume to a second detection volume without passing through an intervening wall structure.

13. The apparatus of claim 11, and wherein each detection volume comprises a substantially columnar portion of the chamber interior overlying one of the plurality of anode pads.

14. A method of measuring ionizing radiation, the method comprising:
   a) creating secondary charged particles by passing the ionizing radiation through a tissue-equivalent cathode member forming one endwall of a chamber containing a tissue-equivalent counting gas, the secondary charged particles producing free electrons within the tissue-equivalent counting gas;
   b) drawing the free electrons toward a micromesh avalanching structure member provided within the chamber using an electric field;
   c) multiplying the free electrons with the micromesh avalanching structure;
   d) collecting at least a portion of the multiplied free electrons using at least two anode pads provided within the chamber, the anode pads positioned such that the secondary charged particles can travel within the chamber from a volume overlying one of the anode pads to a volume overlying an adjacent one of the anode pads without travelling through an intervening solid structure, and each anode pad producing a corresponding anode output signal; and
   e) separately recording each anode output signal using a data acquisition system.

15. The method of any one of claim 14, wherein the micromesh avalanching structure comprises at least one gas electron multiplier (GEM).

16. The method of claim 14, wherein
   a) step a) comprises producing free electrons within a first detection volume and a second detection volume provided within the chamber and in fluid communication with each other whereby the secondary charged particles can travel from the first detection volume to the second detection volume without passing through an intervening wall structure;
   b) step d) comprises collecting at least a portion of the multiplied free electrons produced in the first detection volume using a first anode pad underlying the first detection volume and collecting at least a portion of the multiplied free electrons produced in the second detection volume using a second anode pad underlying the second detection volume; and
   c) further comprising independently determining a dose of ionizing radiation received in the first detection volume based on the anode output signal from the first anode pad, and determining a dose of ionizing radiation received in the second detection volume based on the anode output signal from the second anode pad.

17. The method of claim 16, further comprising collecting at least a portion of the free electrons produced within the first detection volume when a first secondary charged particle travels through the first detection volume and collecting at least a portion of the free electrons produced within the second detection volume when the first secondary particle exits the first detection volume and enters the second detection volume.

18. A radiation detection apparatus comprising a plurality of independent tissue-equivalent proportional counter apparatuses provided in a common gas volume, the radiation detection apparatus comprising:
   a) a first endwall, a second endwall spaced apart from the first endwall and sidewalls extending therebetween to enclose a common gas chamber containing a tissue-equivalent counting gas, the first endwall being a cathode and formed from a tissue-equivalent material that is operable to produce secondary charged particles within the gas chamber when exposed to ionizing radiation;
   b) a plurality of independent detection volumes provided within the common gas chamber whereby the secondary charged particles travelling within the gas chamber produce free electrons within the tissue-equivalent counting gas in one or more of the detection volumes, each detection volume comprising a generally columnar portion of the gas chamber and being in fluid communication with the other detection volumes, whereby secondary charged particles can travel from one of the detection volumes to an adjacent one of the detection volumes without travelling through an intervening solid structure;
   c) an anode pad associated with and underlying each of the detection volumes, the anode pads arranged in a two dimensional array within the gas chamber;
   d) a micromesh avalanching structure provided within the chamber and positioned between the first endwall and the array of anode pads to draw the free electrons produced in each detection volume toward the anode pad associated with and underlying the detection volume, wherein each anode pad generates an anode output signal that is proportional to the quantity of free electrons produced in the detection volume associated with the anode pad; and
   e) a data acquisition system configured to receive an anode output signals from each of the anode pads and independently determine a dose of ionizing radiation received by each detection volume within the gas chamber.

19. The apparatus of claim 18, wherein the micromesh avalanching structure comprises one or more gas electron multipliers (GEM).

20. The apparatus of claim 18, wherein each pad is substantially planar, hexagonal and is laterally spaced apart from each adjacent pad by an offset distance that is between about 0.05 mm and about 0.3 mm.

* * * * *